UNITED STATES PATENT OFFICE.

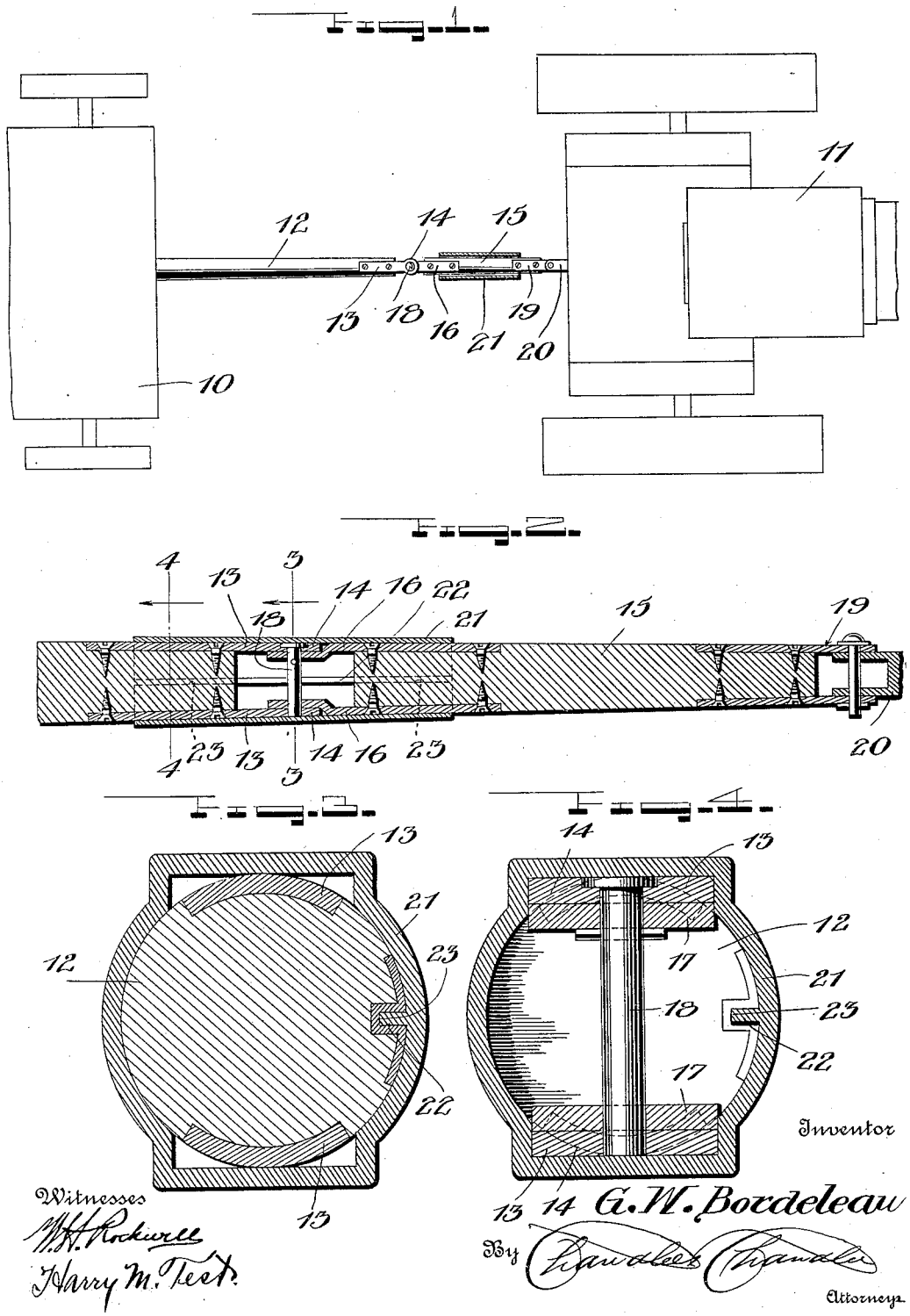

GEORGE W. BORDELEAU, OF BUFFALO, NORTH DAKOTA.

TONGUE AND POLE FOR THRESHING-MACHINES.

1,042,526.  Specification of Letters Patent.  Patented Oct. 29, 1912.

Application filed February 3, 1912. Serial No. 675,136.

*To all whom it may concern:*

Be it known that I, GEORGE W. BORDELEAU, a citizen of the United States, residing at Buffalo, in the county of Cass, State of North Dakota, have invented certain new and useful Improvements in Tongues and Poles for Threshing-Machines; and I do hereby declare the following to be a full, clear, and exact description of the invention, such as will enable others skilled in the art to which it appertains to make and use the same.

This invention relates to improvements in tongues or poles, and particularly to a tongue or pole for use on a threshing machine.

The principal object is to provide a simple device of this character, by means of which the threshing machine may be quickly and easily coupled to the threshing engine without the necessity of great care being taken in attaching the machine straight up to the engine.

Other objects and advantages will be apparent from the following description and with particular reference to the accompanying drawings.

In the drawings: Figure 1 is a fragmentary top plan view of a threshing machine and traction engine, showing my device in operation, Fig. 2 is a vertical longitudinal section through the device, Fig. 3 is a vertical transverse section on the line 4—4 of Fig. 2, Fig. 4 is a vertical transverse section on the line 3—3 of Fig. 2.

Referring particularly to the drawings, 10 represents a threshing machine, and 11 the traction engine, in connection with which my coupling is particularly adapted. Mounted on the threshing machine is the tongue or pole 12 to which is secured the strap 13, said strap having the flattened and perforated head 14. Disposed in front of the end of the pole 12 is a supplemental pole 15, having secured at its rear end the strap 16, the said strap having the perforated head 17 adapted for registration with the head 14, to receive therethrough the pivot pin 18, by means of which the supplemental pole is adapted to swing horizontally. On the outer end of the supplemental pole is the usual coupling clip 19, for connection with the coupling member 20 of the threshing machine.

Mounted on the supplemental pole is a slidable sleeve 21, which has the longitudinally extending rib 22 formed interiorly thereon, said rib being disposed in a longitudinal groove 23 formed in one face of the supplemental pole, the groove and rib preventing rotary movement of the sleeve on the tongue. In the end of the pole 12 is also formed a groove 23 which is adapted to receive the rib 22, when said sleeve is slipped backward over said pole.

When it is desired to couple the threshing machine to the traction engine, and if it should happen that the threshing machine is a little to one side of the coupling of the traction engine, the supplemental pole 16 is swung to one side or the other and coupled thereto. Upon forward movement of the traction engine, the threshing machine will fall into alinement so that the pole 12 is in a straight line. When the sleeve 21 is moved back to engage over the pole 12, the supplemental pole 16 is held rigidly, so that the pole 12 is practically lengthened. If it is desired to couple the pole 12, the pivot pin 18 is removed so that the supplemental pole 16 may be detached.

What is claimed is:

A coupling pole for threshing machines, comprising a pole proper, a strap secured to the outer end of the pole, a supplemental pole, straps on one end of said supplemental pole, the straps of the first-mentioned pole being pivotally connected to the straps of the second-mentioned pole, each of said poles being formed with longitudinally extending grooves, a sleeve mounted on the supplemental pole having a longitudinally arranged interior rib disposed in said groove, said sleeve being adapted for movement toward and away from the first-mentioned pole, whereby the supplemental pole is capable of pivotal movement on the first-mentioned pole or being held rigidly thereto.

In testimony whereof, I affix my signature, in presence of two witnesses.

GEORGE W. BORDELEAU.

Witnesses:
J. H. WENDEL,
S. G. MORE.

Copies of this patent may be obtained for five cents each, by addressing the "Commissioner of Patents, Washington, D. C."